Patented May 23, 1944

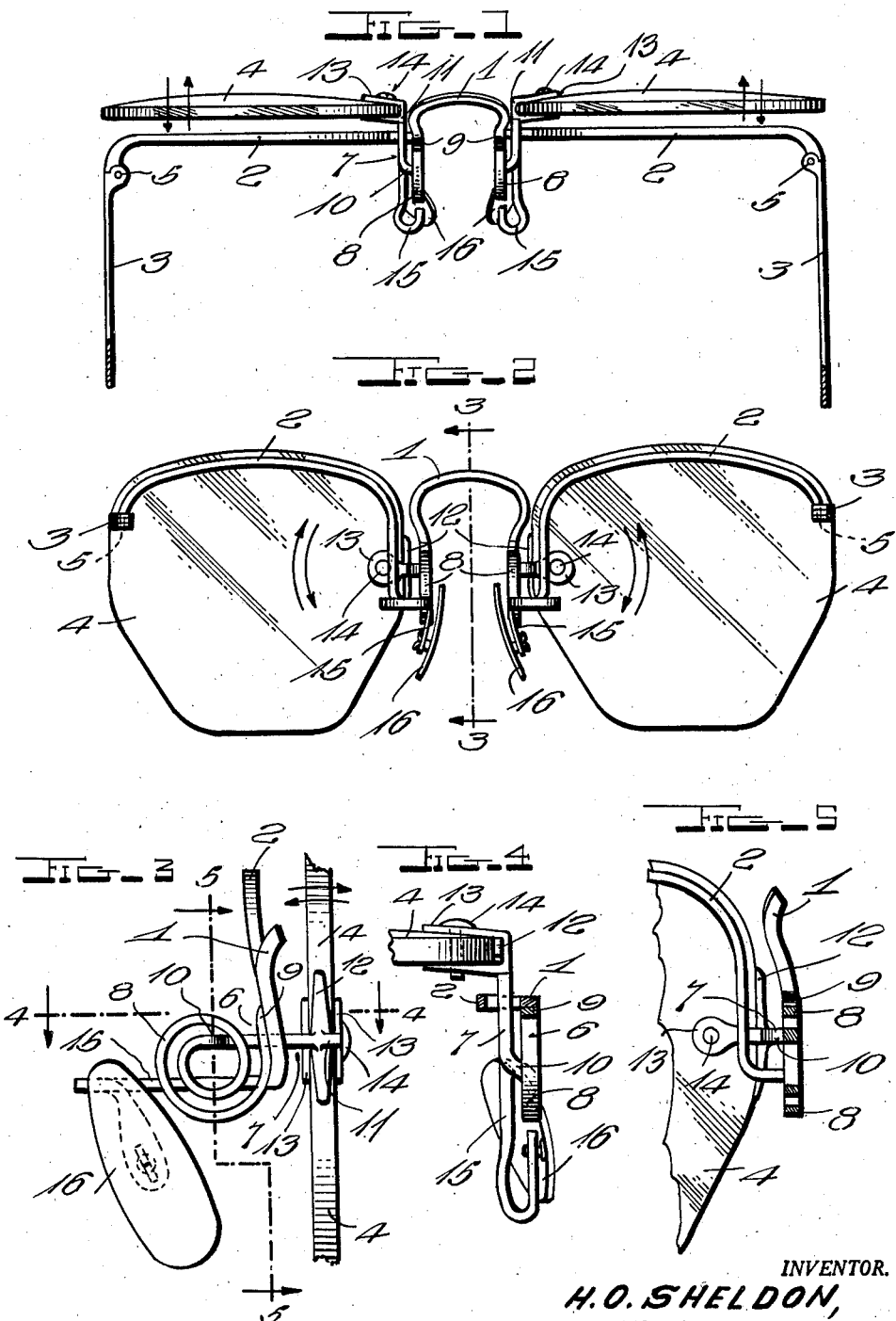

2,349,764

UNITED STATES PATENT OFFICE 2,349,764

SPECTACLES

Harry O. Sheldon, Willmar, Minn.

Application April 27, 1942, Serial No. 440,705

3 Claims. (Cl. 88—41)

This invention relates to improvements in spectacles of that class in which the spectacle frame or lens mounting comprises a nose piece or bridge and temple arms extending therefrom above or in rear of the top edges of the lenses to the outer edges of the lenses where they are hinged to temple pieces, the lenses being supported at their inner edges by shoes and straps rigidly connected to the frame or mounting.

Owing to the fact that in this type of spectacles the shoes and straps are rigidly connected to the mounting, the lenses are subjected to liability of breakage by bumps or jars, or to loosening at the straps and fastening screws by vibration, especially when wiping and cleaning the lenses.

One object of my invention is to avoid this objection by connecting the lenses with the spectacle frame or mounting so as to adapt them to yield when subjected to shocks or jars, or moved under pressure with relation to the frame, thereby reducing liability of breakage thereof.

Another object of the invention is to provide a construction in which each lens is carried by a connecting spiral spring between the nose piece and the lens shoe and strap which, in case of a bump or jar or independent movement of the lens, will absorb the shock and prevent or reduce liability of breakage of the lens to a minimum.

Still another object of the invention is to provide a spring mounting for the lenses whereby the lenses will be supported parallel with and in advance of the temple arms, so as to adapt them to yield freely in any direction to reduce liability of breakage thereof under pressures or strains.

Still another object of the invention is to provide spectacles of the character described wherein the nose piece and temple arms may, if desired, be made continuous with each other, or of a unitary structure, to which the lens and pad carrying arms may be soldered directly so as to simplify the construction while increasing the strength and rigidity of the frame or mounting on which the lenses are resiliently supported.

With these and other objects in view, which will appear in the course of the subjoined description, the invention consists of the novel features of construction, combination and arrangement of parts, hereinafter fully described and claimed, and shown in the accompanying drawing, in which—

Fig. 1 is a top plan view of a pair of spectacles embodying my invention.

Fig. 2 is a rear elevation of the same.

Fig. 3 is a section on an enlarged scale taken substantially on line 3—3 of Fig. 2 through the nose piece and looking toward one of the lenses and associated parts of the mounting.

Fig. 4 is a section on the line 4—4 of Fig. 3.

Fig. 5 is a section on the line 5—5 of Fig. 3.

Referring now more particularly to the drawing, 1 designates the nose piece or bridge, 2 the temple arms, 3 the temple pieces and 4 the lenses of a pair of spectacles of the type described, in which the temple arms are connected at their inner ends to the nose piece or bridge and thence extend outwardly substantially in parallel relation to the upper edges of the lenses and are hinged, as shown at 5, at their outer ends to the temple pieces. In accordance with my invention, the inner ends of the temple arms 2 may be and preferably are, integrally connected with the sides of the bridge 1, the temple arms and nose piece thus being of unitary construction and formed of a single piece of metal bent and otherwise properly shaped. This construction of the spectacle frame per se ensures simplicity of structure as well as economy of manufacture, and does away with the necessity of brazing or soldering component parts of the frame together, with the result also of facilitating the application of the other parts of the spectacle thereto. However, if desired, the bridge and temple arms may be, within the scope of my invention, made of separate pieces brazed, soldered or otherwise connected together.

In either mode of construction of the frame, each side or depending leg of the bridge 1 is connected with the depending end portion or leg of the adjacent temple arm 2 so as to form a U-shaped connection between the bridge and each temple arm the legs of which are disposed side by side and in properly spaced relation to each other. By this construction of the frame a frame of a high degree of strength and rigidity may be formed notwithstanding the fact that the frame members may be made of comparatively light metal or other material.

Each lens 4 is mounted at its inner edge at its side of the frame by a resilient support 6 upon the frame. This support comprises a bracket member 7 formed of spring metal which is flat or preferably of non-circular form in cross-section, but which, in practice, may be of any desired form. This bracket member is shaped to provide a spiral spring portion 8, which is preferably of flat type or all of which portions lie in a common plane. The coil 8 is arranged vertically in rear of the adjacent side or leg of the bridge 1 and in rear thereof and its outer convolution is extended to form an arm 9 which is brazed, soldered or otherwise rigidly fixed to such leg of the bridge. The inner convolution of the spiral spring has its terminal portion offset outwardly beyond the plane of the spring, as shown at 10, and extended along one side of the coil and forwardly to form an arm 11. This arm 11 carries the shoe 12 and straps 13 which bear respectively against the inner edge and inner and outer faces of the lens 4 and to which the lens is fastened by a rivet, screw or other fastening member 14 passing through the straps and lens. Another bracket member or arm 15 is brazed, soldered or otherwise fastened to the leg of the bridge 1 adjacent each lens supporting bracket and projects rearwardly from the frame to a point beyond the associated spiral spring and carries the nose clamp 16 which may be of any suitable form or type and suitably fastened thereto.

As a result of the construction described it will be seen that the lenses 4 are resiliently supported from a rigid frame in such a manner that the lenses will be strongly supported, while at the same time they are mounted for yielding motions in all directions. It will be observed that the temple arms 2 are disposed so that they extend on lines parallel with the upper edges of the lenses, and just below the plane thereof, but are arranged in rear of the lenses so that the lenses may yield forwardly and rearwardly toward and from the said temple arms without interference therefrom. By this arrangement the lenses are kept in proper position by the action of the coiled springs before the eyes, but by reason of their flexible mounting and the arrangement of the springs they are permitted to yield in any direction when subjected to vibrations, shocks or jars or pressure, the springs absorbing the shocks or vibrations and minimizing liability of breakage of the lenses. The yielding action, when pressure falls upon the lenses, as when they contact with an object or are being cleaned or wiped, also relieves the lens screws and shoes from pressure and liability of loosening and causing chattering of the lenses and liability of the breakage thereof. The continuous or one-piece construction of the temple arms and bridge renders the frame construction more rigid and durable and reduces the number of steps required in the manufacture thereof and the assemblage of the parts of the spectacle. Owing to the described form and location of the frame and springs, the springs and lens carrying portions may be mounted in a very compact manner, adding to rather than detracting from the aesthetic appearance of the article.

From the foregoing description, taken in connection with the drawing, the construction and advantages of my improved spectacles will be readily understood without a further and extended description, and it will be seen that the invention provides a structure which secures the ends sought in a simple, reliable and efficient manner. While the structure disclosed for purpose of exemplification is preferred, it will, of course, be understood that changes in the construction, form and arrangement of parts may be made within the scope of the appended claims without departing from the spirit or sacrificing any of the advantages of the invention.

What I claim is:

1. Spectacles comprising a frame including a nose piece and temple arms, lenses, and bracket members resiliently supporting each lens from the frame and each including a vertically disposed coiled spring arranged in rear of the frame and lens, said spring having its coils disposed in a common plane, the inner terminal coil being provided with a lateral offset and an arm extending forwardly therefrom and connected to the inner edge of the lens and the outer terminal coil having a terminal portion at the front thereof connected with the frame.

2. Spectacles comprising a frame including a bridge and temple arms formed from a single piece of material, lenses, and spring connections resiliently supporting the lenses from the frame, and each including a vertically disposed coiled spring arranged in rear of the frame and lens, said spring having its coils disposed in a common plane, the inner terminal coil being provided with a lateral offset and an arm extending forwardly therefrom and connected to the inner edge of the lens and the outer coil having a terminal portion at the front thereof connected with the frame.

3. Spectacles comprising a bridge piece having its legs provided with rearwardly projecting bracket arms, nose clamping members carried by said arms, lenses arranged on opposite sides and in advance of the bridge piece, a support attached to each lens, a coiled spring disposed in rear of each leg of the bridge piece in line with said leg and having its convolutions disposed in the same vertical plane, the inner convolution of said coil being provided with an outwardly extending lateral offset and an end terminal forming an arm extending forwardly therefrom parallel with the coil and in advance thereof and attached to the support of the adjacent lens, the outer convolution of the coil being extended upwardly in front of the coil and fastened to the rear face of the adjacent leg of the bridge piece, and temple arms extending inwardly along the lenses and adjacent to the upper edges thereof and extending at their inner ends downwardly and laterally beneath the lens supporting arms of the coils and fixed to the legs of the bridge piece.

HARRY O. SHELDON.